United States Patent
O'Regan et al.

(10) Patent No.: US 10,277,027 B2
(45) Date of Patent: Apr. 30, 2019

(54) APPARATUS FOR ISOLATING A NETWORK PROTECTOR IN AN ELECTRIC POWER DISTRIBUTION NETWORK

(71) Applicant: Electrical Materials Company, Genoa City, WI (US)

(72) Inventors: Timothy M. O'Regan, Chicago, IL (US); Timothy J. O'Regan, Park Ridge, IL (US)

(73) Assignee: ELECTRICAL MATERIALS COMPANY, Genoa City, WI (US)

( * ) Notice: Subject to any disclaimer, the term of this patent is extended or adjusted under 35 U.S.C. 154(b) by 0 days.

(21) Appl. No.: 15/657,365

(22) Filed: Jul. 24, 2017

(65) Prior Publication Data
US 2019/0027924 A1  Jan. 24, 2019

(51) Int. Cl.
*H02H 7/26* (2006.01)
*H01R 13/207* (2006.01)

(52) U.S. Cl.
CPC ............. *H02H 7/26* (2013.01); *H01R 13/207* (2013.01)

(58) Field of Classification Search
CPC ............ H02H 7/261; H02H 7/30; H02H 7/22; H02H 7/268; H02H 1/0007
USPC .......................................................... 361/62
See application file for complete search history.

(56) References Cited

U.S. PATENT DOCUMENTS

| | | | | | |
|---|---|---|---|---|---|
| 2,306,591 | A | * | 12/1942 | Chase | H02H 7/26 361/64 |
| 2,376,775 | A | * | 5/1945 | Johnson | H02H 3/044 324/756.01 |
| 2004/0008461 | A1 | * | 1/2004 | Kojovic | H02H 3/28 361/62 |
| 2004/0027748 | A1 | * | 2/2004 | Kojovic | H02H 3/28 361/62 |
| 2018/0233895 | A1 | * | 8/2018 | O'Regan | H02H 3/083 |

* cited by examiner

*Primary Examiner* — Dharti H Patel
(74) *Attorney, Agent, or Firm* — Greer Burns & Crain, Ltd.

(57) ABSTRACT

An apparatus for isolating a malfunctioning network protector from the power distribution network and for allowing the network protector to be safely reset. The apparatus includes: a 3 phase controller coupled by parallel single phase poles in plural contactors to the fuse link and adapted to receive an electric load current flowing in reverse through the network power transformer; a remote controlled switch coupled to the controller for switching the electric load current from the network protector via the controller to the network bus, with the controller then carrying the electric load current in parallel with the network protector fuse link; and visual indicators coupled to the controller for showing when the remote controlled switch has been activated to transfer the load current from the fuse links to the controller and when the electric load current has been transferred from the controller to the network bus.

15 Claims, 6 Drawing Sheets

APPARATUS FOR ISOLATING A NETWORK PROTECTOR IN AN ELECTRIC POWER DISTRIBUTION NETWORK

FIELD OF THE INVENTION

This invention relates generally to electric power distribution networks, and is particularly directed to the isolation of a network protector from the network to permit the safe clearing (interrupting reverse load current flow) of a malfunctioning network protector in the event the malfunctioning network protector is stuck on backfeed.

BACKGROUND OF THE INVENTION

The typical electrical power distribution underground network is in the form of a grid having multiple network vaults, commonly referred to as network centers, connected together on the secondary, or customer, side of the network transformers to provide service for multiple customer loads. The system's primary side is connected to source of electrical power which is typically from electric utility substation and includes multiple network transformers in a vault fed from separate primary feeders connected in parallel on the secondary side. The substations are connected via primary network feeders on the primary side of the network to provide service to multiple network centers. The network transformers are connected with together via secondary cables also called secondary mains. The secondary mains, the customer load, are typically connected by means of inline current limiting fuses in series with service cables. The grid network centers provide a high level of redundancy. When one or more transformers in the network center become disabled or de-energized, the customer's load is maintained by balance network transformers in the vault center that remain in service. The secondary voltage in the grid network is designated as either 120/208V or 277/480V, where the first value in each expression indicates the voltage relative to (neutral) ground, and the second value in each of the aforementioned expressions indicates the voltage relation of the 3 phase's to each other. It is important that the phase angle of each of the phase voltages in each of the three cables be equal, or as close as to equal as possible, to provide maximum energy transmission efficiency with the three phases more or less equally sharing the load, as well as for safety considerations. Differences in phase angle between the operating voltages of the network feeder cables can result in damage to the network. In extreme cases even result in the destruction of the forced paralleling of out of phase feeders system components. Out of phase angle conditions also pose a very dangerous situation for workers who maintain the network. Great care is taken by electric utilities to maintain the phase angle between network primary feeder voltages at a minimum yet this condition does persist and this invention proposes a safe operating solution.

The aforementioned network protectors are designed to trip open when backfeeding current an abnormal operating condition. When large differences in voltage or phase angle are detected in paralleled network feeders, the network protector isolates the backfed transformer from the other transformers to which it is connected. The secondary network protector normally automatically isolates a transformer exhibiting abnormal operating conditions (backfeeding) from the secondary network system in response to predetermined electrical conditions controlled by a master relay. Network protectors are subject to malfunction or a lock-up condition during operation which permits the load current to flow in the opposite direction from the flow direction in normal operation, so as to direct the current flow from the low voltage secondary side to the high voltage primary side resulting in a highly dangerous condition in the networked group of high voltage network feeder lines. The present invention is directed to quickly and safely isolating a malfunctioning network protector from the network to allow the network protector to be cleared without an interruption in electric service or endangering those who maintain and repair the network.

A locked backfeeding network protector must be opened to solve both load flow problems and clear the device for sale repair.

Present approaches to isolating a malfunctioning network protector include the following alternatives:

(1) Interrupting all power served by the single network center resulting in a shutdown of electric service to all customers served from that vault. This presents a difficult situation for customers, particularly in large buildings having elevator systems with elevators stranded between floors.

(2) Another approach involves opening substation circuit breakers servicing the primary network feeders involved and interrupting all service to connected customers and then manually opening the defective secondary protector and associated network transformer primary switch.

Another method for achieving the above is to leave the primary connections as is and proceeding as follows:

1. Manually set the substation supply voltage regulators to minimize the backfed current on the defective unit through voltage control.

2. Parallel the isolating secondary fuse links with a breaker or switch to transfer the load current for isolation by unbolting the transformer side fuse links, one phase at a time.

3. With fuse links open, the defective protector can be manually opened.

4. With the defective secondary protector open, the interlock protection is now disabled and the associated network transformer primary switch can be opened, interrupting only magnetizing current and grounded for safe repair.

To prevent network feeder collapse, the time frame for using this procedure to clear a faulty network protector is limited to a very light load period and is not undertaken at any other time. In addition, the three network transformer protector clearing approaches discussed above have been the subject of OSHA complaints relating to the unsafe conditions to which workers are exposed in isolating a faulty network protector.

Single phase load dropping can also be precarious with possible arcing associated with load interruption on three phase ever-changing load levels. While less dangerous than the 3 phase isolation of a network protector, the single phase approach is also dangerous because of the lengthy time lag associated with completion of de-energizing of all the phases. The time required to control load flow with primary voltage regulation in a substation having as many as four primary network feeder sources can result in excessive heating of the various electric components, including the load carrying cables, resulting in damage to, or destruction of, exposed network components. These conditions are particularly dangerous in close proximity to a live malfunctioning network protector.

The present invention addresses the aforementioned limitations of the prior art by providing a quick, safe and automatic approach to resolving the problem of a defective network protector in an electrical power distribution network.

OBJECTS AND SUMMARY OF THE INVENTION

Accordingly, it is an object of the present invention to improve reliability and safety while providing electric power via a grid network incorporating multiple transformer-based network centers.

It is another object of the present invention is to provide at the problem network vault location for the remote simultaneous 3 phase isolation of a faulty backfed network protector in an electric power distribution network.

Yet another object of the present invention is to automatically accommodate an electric power distribution network having an operating control voltage of either 120V/208 volt or 277/480 volt in servicing a network protector device within the electric power distribution network.

A further object of the present invention is to improve customer service and satisfaction as well as worker safety in terms of a utility-based electric power distribution network.

A still further object of the present invention is to reduce the time required for servicing or replacing a locked-up, or otherwise faulty, network protector device in an electric power distribution network with greater safety and load free interruption-free customer service.

Still another object of the present invention is to provide voltage overload protection and back-up emergency tripping of network load carrying contactors for improved safety including illuminated optical means for indicating status of bypass contactor in locked-up condition in a network protector device in an electric power distribution power network.

Still another object of the present invention is to provide a portable, remote controlled system for quickly and safely isolating a network protector device in an electric power distribution network.

BRIEF DESCRIPTION OF THE DRAWINGS

The appended claims set forth those novel features which characterize the invention. However, the invention itself as well as further objects and advantages thereof, will best be understood by reference of the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
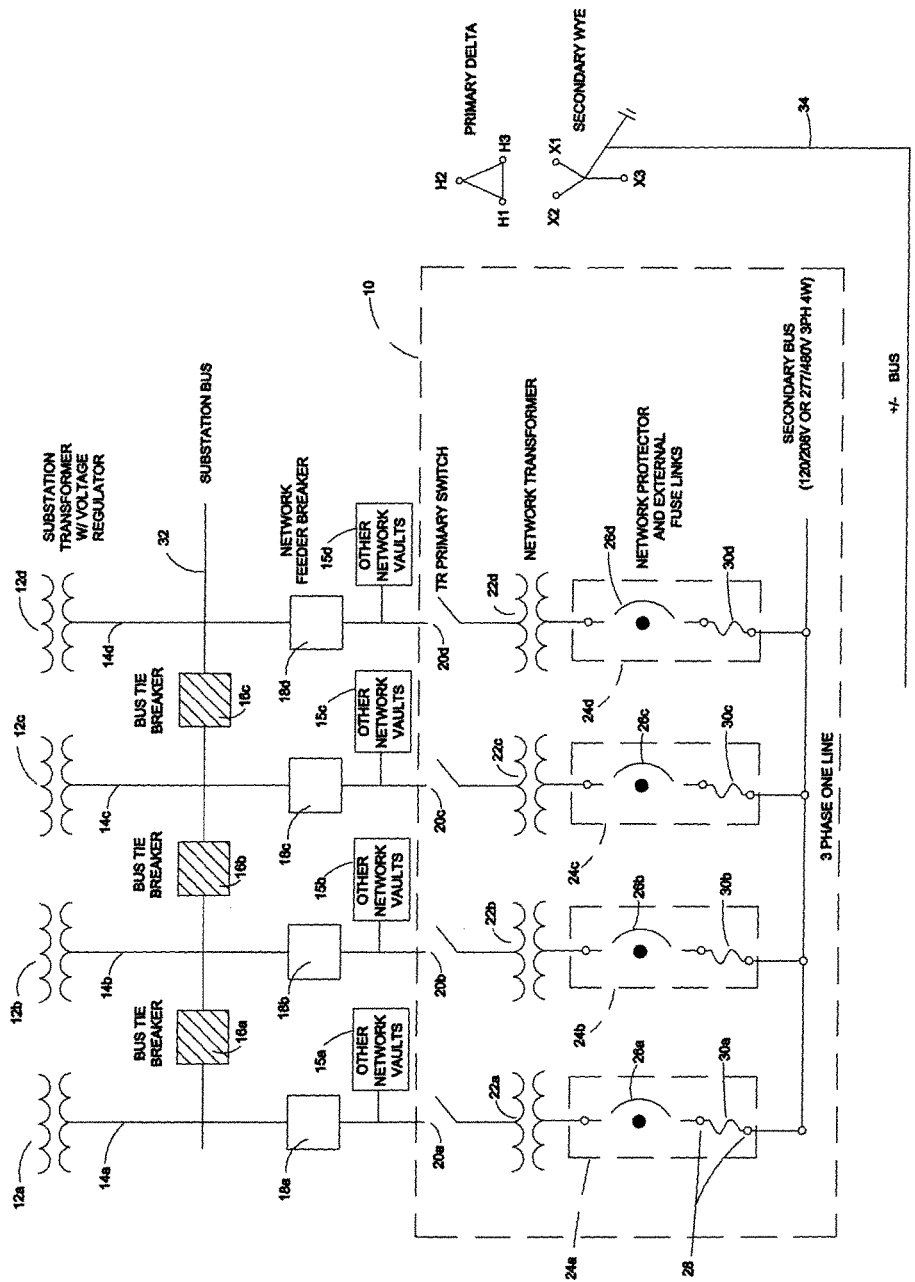
FIG. 1 is a simplified block and schematic diagram of the electrical configuration within a network center, served from substations, in a conventional electric power distribution network.

FIG. 1 is a combined schematic and block diagram of the portion of a conventional electrical power distribution network transformer disposed within a network vault 10 in a conventional electrical power distribution network. Network vault 10 includes four paralleled transformers 22a-22d each coupled to a respective network energized secondary bus. The substation transformers with voltage regulators 12a-12d for the network maintain the input voltage provided to the network vault 10 so as to match the primary voltage supplied by each networked substation transformer 12a-12d. The substation 10 transformers bus further includes three normally open bus tie breakers 16a, 16b and 16c connected between each adjacent pair of network cables 14a-14d, and further coupled to a substation bus 32. Also connected to respective network cables 14a-14d are four network feeder breakers 18a-18d. Other network vaults 15a-15d are coupled to each of the four network cables 14a-14d at the output of each of the respective network feeder breakers 18a-18d. The outputs of the four network feeder breakers 18a-18d are also provided to the network vault 10 which includes four transformer primary switches 20a-20d. Each of the transformer primary switches 20a-20d within the network substation 10 is coupled to a respective one of the four network transformers 22a-22d arranged in parallel within the network group. The output of each of the four network transformers 22a-22d is then provided to a respective input of one of four network protector enclosures 24a-24d within the network vault 10. Each of the four network protector enclosures 24a-24d includes a respective network protector 26a-26d each arranged in series with an associated secondary network fuse link 30a-30d. Thus, the first network protector enclosure 24a includes a first network protector 26a bolted to a first fuse link 30a. The second network protector enclosure 24b includes a second network protector 26b bolted to a second fuse link 30b. The third network protector enclosure 24c includes a third network protector 26c connected such as by a bolt to a third fuse link 30c. Finally, the fourth network protector enclosure 24d includes a fourth network protector 26d connected such as by a bolt to a fourth fuse link 30d. The output of each of the four network protector enclosures 24a-24d is coupled to a three (3) phase secondary bus 34 operating at either 120/208V or 277/480V. The phase relationships between the phase voltages in each of the primary, or source, side cables and in the secondary, or consumer, side of the electrical network are respectively shown by the "delta" and "Y" diagrams in the right-hand portion of FIG. 1, where the phase relationship of the voltages in the three cables of the single line secondary bus are illustrated in the right hand portion of the figure. The "delta" represents the phase relationship in the lines coupled to the primary, or source, side of a network transformer, while the "Y" represents the phase in the lines coupled to the secondary, or end-user, side of the network transformer. In other words, the "delta" diagram illustrates how the primary windings are connected, where $H_1$ is the A phase current, $H_2$ is the B phase current, and $H_3$ is the C phase current. The "Y" diagram illustrates how the secondary windings are connected and the junction of the secondary winding connections is the neutral $X_0$.

Figure 2:
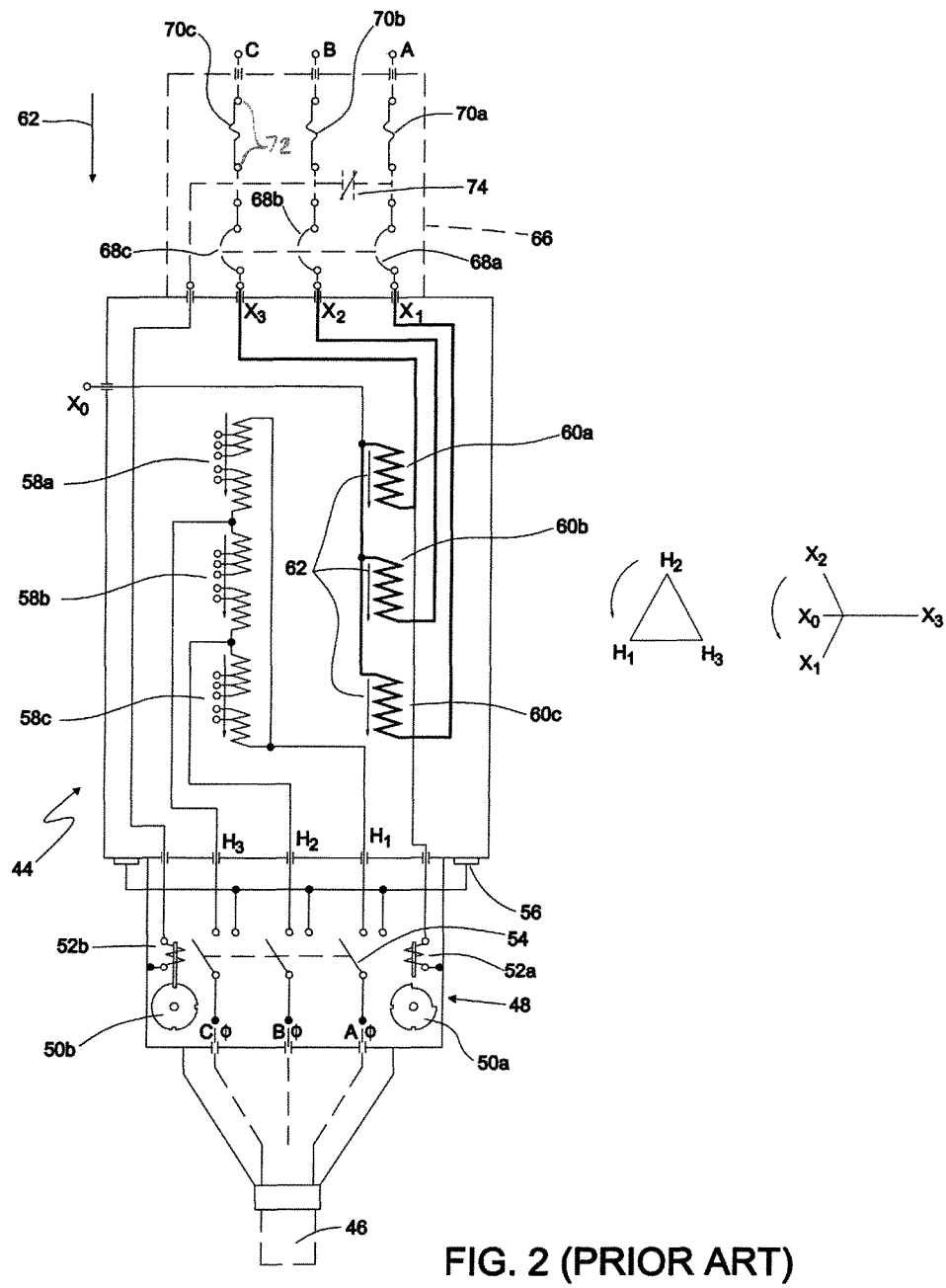
FIG. 2 is a simplified schematic and block diagram of an electrical network transformer and its connections with which the inventive remote controlled, portable system for isolating a malfunctioning backfed network protector.

Referring to FIG. 2, there is shown a schematic diagram of a network transformer 44 corresponding to the network transformers 22a-22d illustrated in FIG. 1 incorporated in a conventional electrical network power center, or vault, 10 shown in FIG. 1. Transformer 44 is coupled to a three-phase high voltage cable 46 connected to a substation source of electrical power (not shown). The three phases within the high voltage cable casing 46 are each connected to a respective one of three primary phase disconnect pole contacts 54. Connected to the input side of network transformer 44 is a terminal chamber 48 which includes first and second rotating safety interlock solenoids 52a and 52b which are only operable when the control voltage contact, or fuse link, 74 on the secondary network side of the network transformer 44 is in the open position. The associated primary position switch 54 with rotating safety interlocks 50a and 50b allows for opening primary switches 20a-20d shown in FIG. 1 to isolate the network transformer 44 from the high voltage cable 46 only when the secondary load side network protectors 68a, 68b and 68c and control contact 74 are open.

Transformer 44 further includes three high voltage switches 56 connected to the source side of windings 58a, 58b and 58c which receive the source side voltage from the high voltage cable 46. Each of the three primary windings 58a, 58b and 58c is electromagnetically coupled to a respective one of three secondary windings 60a, 60b and 60c. The outputs of each of the secondary windings 60a, 60b and 60c is provided to a respective one of three network contactors 68a, 68b and 68c within a secondary network protector enclosure 66.

Each of the three contactors 68a, 68b and 68c is coupled to a respective one of fuse links 70a, 70b and 70c via bolts 72. The secondary network protector 66 can be electrically isolated while energized from the network transformer secondary windings 60a, 60b, and 60c by removing the bolts 72 and fuse links 70a, 70b and 70c which are also connected to 3 cables in the secondary, or load side, of the network protector to the three phase secondary network, or vault, bus 34.

Figure 3:
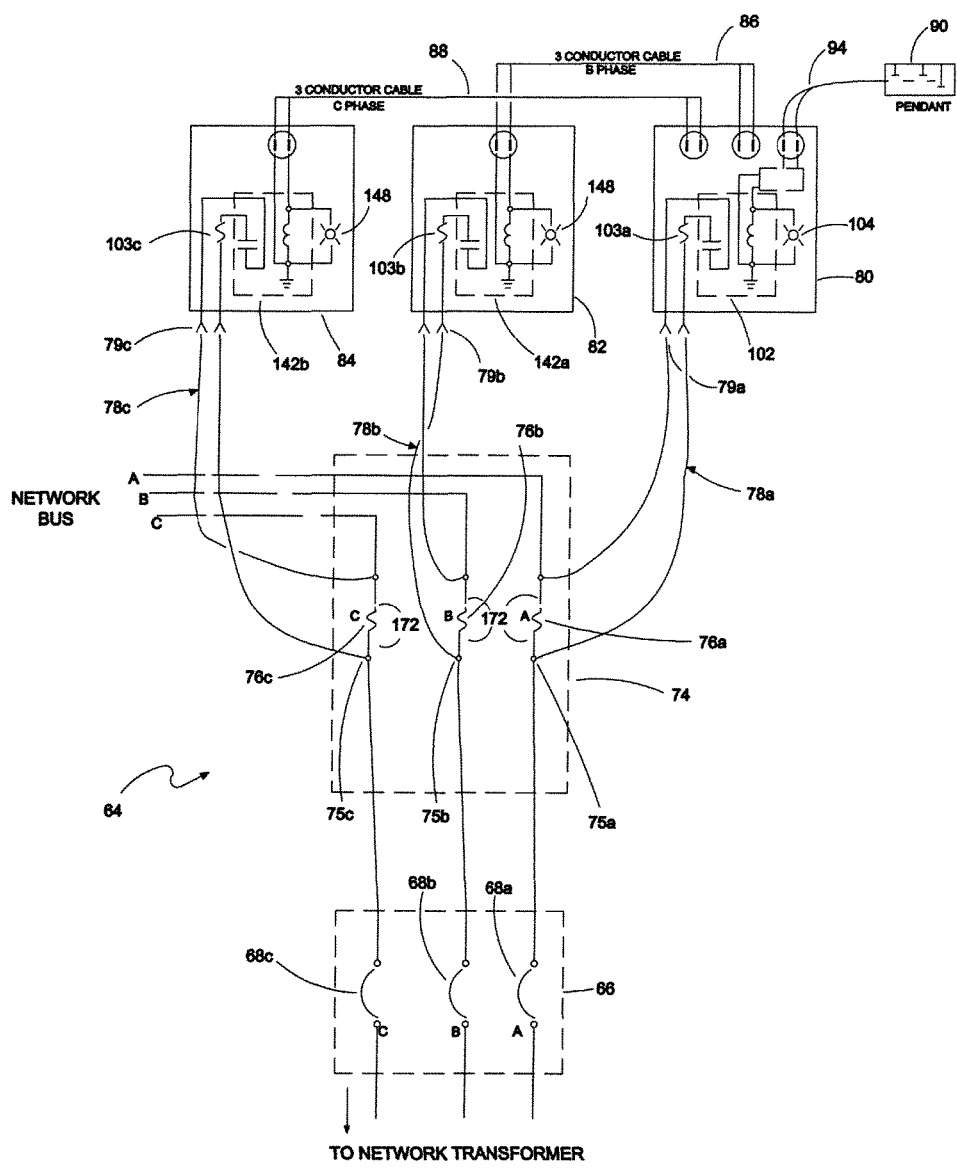
FIG. 3 is a combined schematic and block diagram of the network isolation system for simultaneous three phase isolation of a backfed network protector in an electric power distribution network in accordance with the present invention.
Figure 6:
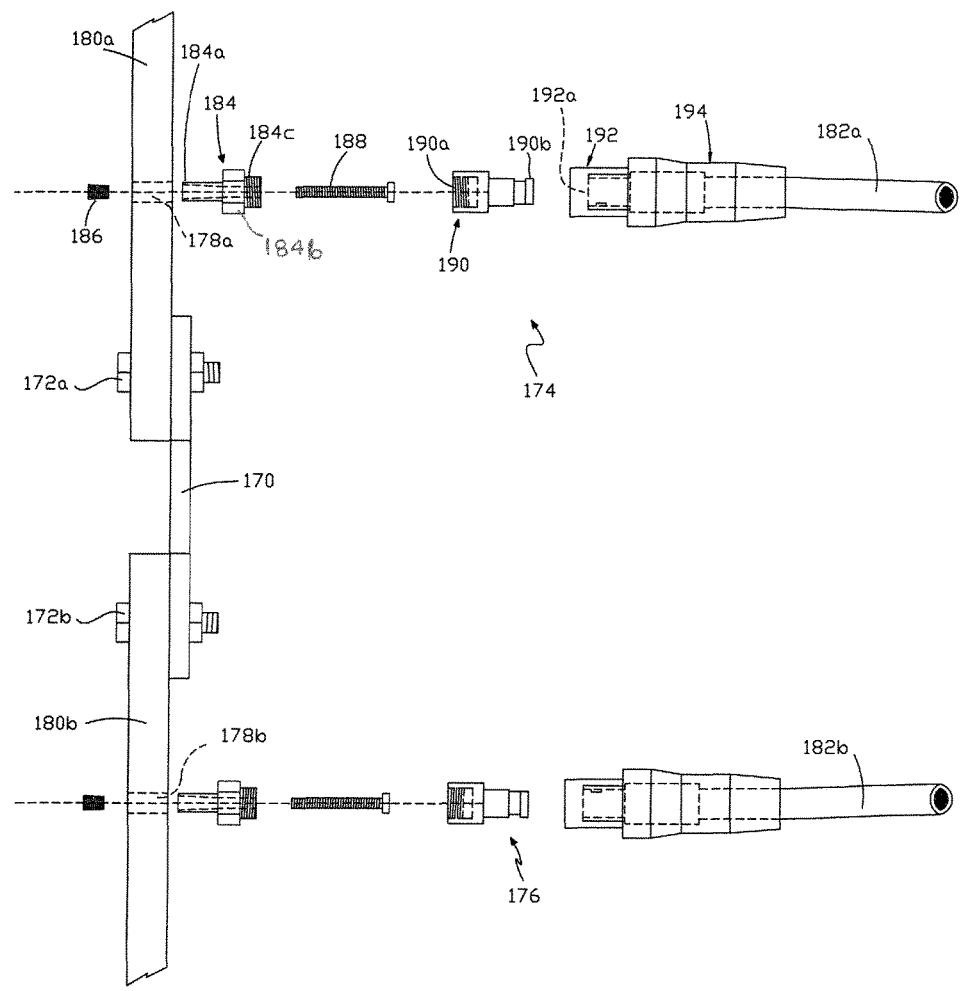
FIG. 6 is an exploded lateral sectional view of an arrangement for coupling the inventive electrical power network protector isolator's bus bar to an electric power cable.

Referring to FIG. 3, there is shown in simplified schematic and block diagram form a system 64 for simultaneously clearing a 3 phase, energized backfed electrical network protector 66 in accordance with the principles of the present invention. The use of temporary remote operated 3 single phase portable contactors 80, 82 and 84 provides simultaneous remote controlled closing (parallels each portable contactor across associated fuse links 76a, 76b and 76c), and subsequent interruption of 3 phase electrical power current which is flowing in reverse as indicated by arrow 62 in FIG. 2 (low voltage to high voltage) through a defective electrical network secondary protector 66. The system includes the aforementioned secondary network protector 66 having first, second and third contacts 68a, 68b and 68c, as well as the aforementioned three fuse links 76a, 76b and 76c which are shown in FIG. 3. The three network protector contacts 68a, 68b and 68c are coupled to respective first, second and third fuse links 76a, 76b and 76c by a copper bus which is coupled to respective network bus cables A, B and C forming the network bus. The fuse links 76a, 76b and 76c are also coupled via respective pairs of jumper cables 78a, 78b and 78c to phase A control unit 80, phase B control unit 82 and phase C control unit 84. First, second and third pairs of cam-type connectors 75a, 75b and 75c respectively couple the three pairs of jumper cables 78a, 78b and 78c to the network bus cables A, B and C. Fuse links 76a, 76b and 76c function as a disconnect device under the control of the phase A, phase B and phase C control units 80, 82 and 84. The operator remotely operates the pendant 90 push buttons 128 shown in FIG. 4 opening the portable contactors 102, 142a and 142b decoupling the defective secondary network protector 66 which is safely and quickly cleared. Additional details of the coupling of the inventive electrical power network protector isolator's bus bar to an electric power cable are described in detail below and are illustrated in FIG. 6. The A phase control unit 80 and B phase control unit 82 are coupled by a first control conductor pair 86, while the A and C phase control units are coupled by a second control conductor cable pair 88. The A phase control unit 80 serves as a master controller of the B and C phase control units and itself is controlled by a remote pendent switch 90 connected to the A phase control unit by means of a 3 conductor remote control cable 94.

The 400 amp rated single phase poles of each of the three phase contactors 102, 142a and 142b are paralleled to provide the contactors with 1200 amp single phase load interrupting capacity. The paralleled contactors 102, 142a and 142b are derated 75% to provide 800 amp thermal load capacity for 30 minute duration. The contactor load is carried via a set of six insulated Leviton #16 series bushing female and male tapered cam-type locking connectors 79a, 79b and 79c connected to the 4/0 flexible welding cables 78a, 78b, 78c and connected to tapered cam-lock bushing connectors 75a, 75b and 75c to current limiting fuses 144 (shown in FIG. 5) and lastly to load carrying contactors 102, 142a and 142b.

Figure 4:
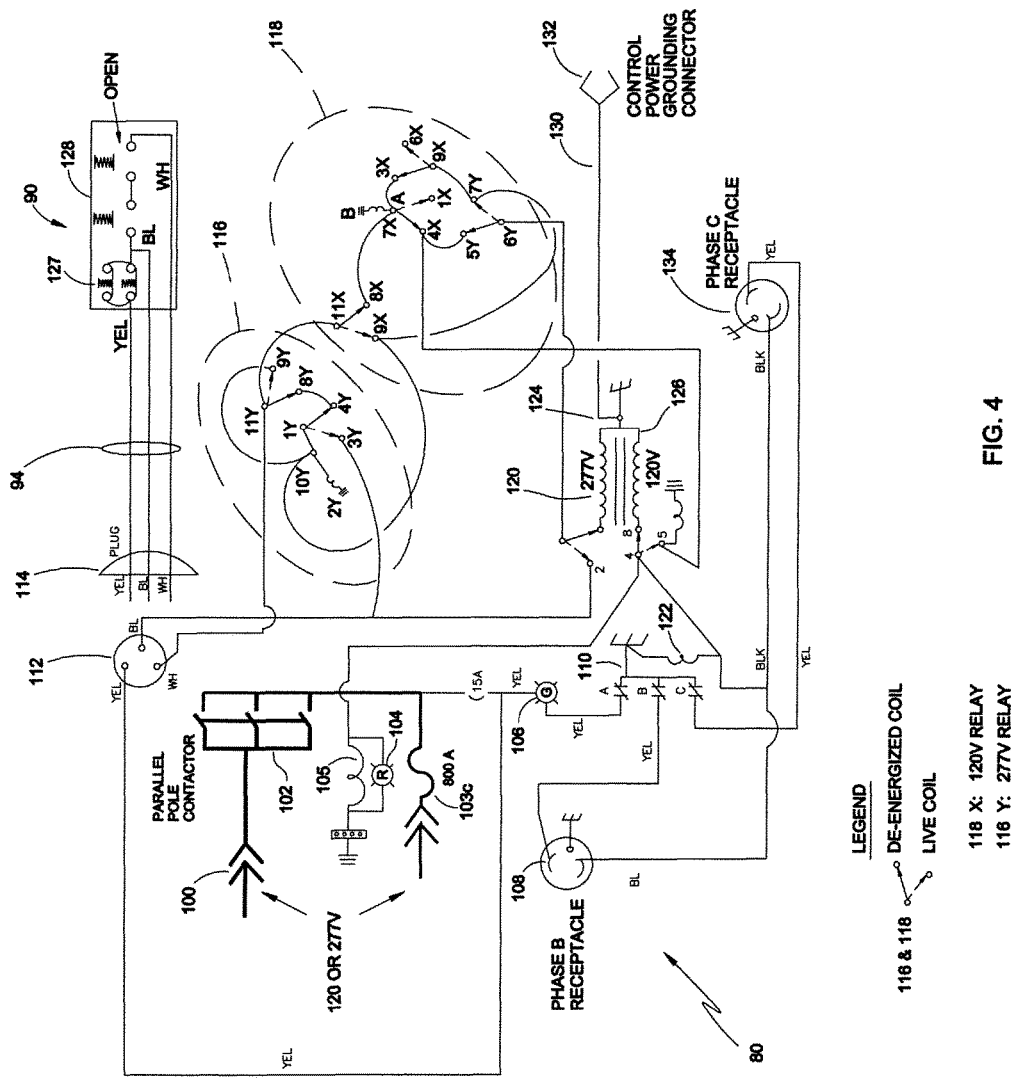
FIG. 4 is a schematic diagram of a main control unit for isolating a network protector unit in an electric power distribution network.

The 800 amp (load carrying capacity for 30 minutes) 4/0 extra flexible welding, 600 volt insulated, multi-strand load carrying cables 78a, 78b and 78c are connected on both sides of all 3 single phase contactors 102, 142a and 142b As shown in FIG. 4, safety operation is provided by a remote control pendant switch 90 coupled to the A phase control unit 80 by means of a twenty (20) foot control cable 94. The pendant switch 90 includes a paralleled closing pendant button 126 and a tripping paralleled pendant button 128. Engaging the closing pendant button 126 causes closure of parallel load breaker contactors 102, 142a and 142b, while engaging the tripping pendant button 128 causes tripping of the three aforementioned load breaker contactors releasing, or disconnecting, the troubled network protector and associated network transformer from the network vault 10.

As shown in FIG. 6, modified Leviton male cam-type studs 184a, 184b and 184c are attached permanently via the upper and lower network protector bus bars 180a and 180b to both sides of the network fuse link 170 on the network protector bus. The EMC modified brass Leviton cam-type studs 184a, 184b and 184c require special network protector bus attachments for adequate emergency current carrying capacity.

Figure 5:
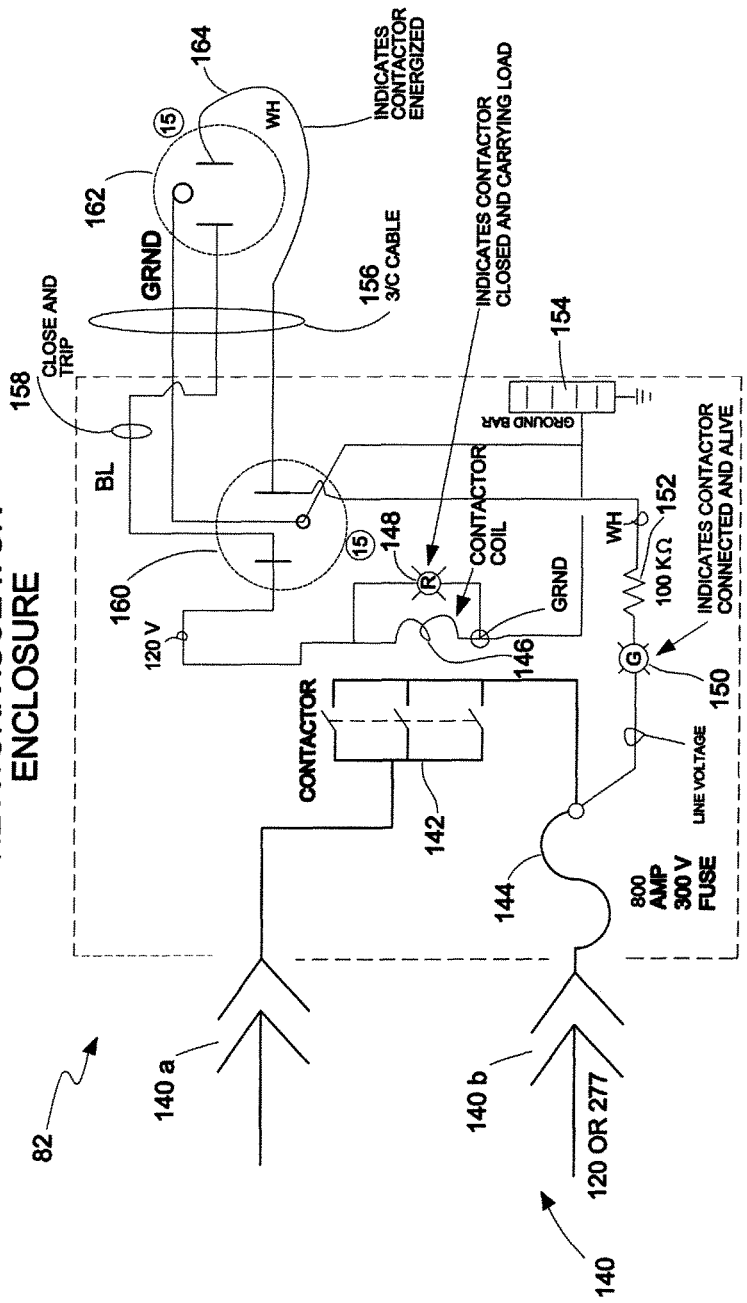
FIG. 5 is a schematic diagram of network isolation contactor arrangement in the present invention for clearing the B or C phase portions of the network protector.

As shown in FIG. 4, fifteen (15) amp, 125 volt rated locking plugs 134, 108 and 112 and sockets 160, 162 shown in FIG. 5 of industrial grade locking devices provide connection of the control cable 164 between the A, B and C phase control units 80, 82 and 84.

Also as shown in FIGS. 3 and 4, control transformer 120 with taps 277-115 volt provides 120 volts for operation of 120 volt contactor coils 102, 142a and 142b in each of A, B and C phase control units 80, 82 and 84 when 277 volt is the available phase to ground at 277/480 voltage network center vaults.

Referring to FIG. 4, there is shown a combined schematic and block diagram of the A phase control unit 80 in accordance with the present invention. The 120 or 277V input consists of both power to be interrupted and control power provided to the A phase control unit 80 via a connector 100. The A-phase control unit 80 includes a parallel pole contactor 102 as well as an 800-amp current limiting fuse 103c. Contactors 102, 142a and 142b have no fault interrupting capacity which is preceded by its respective associated current limiting fuse 103a, 103b and 103c. A green indicator light 106 on each contactor assembly confirms electrical connections are safely completed to a first phase B control receptacle 108 and to a second phase C control receptacle 134. The parallel pole contactor 102 is coupled to green indicator lights 106a, 150b and 150c for indicating that each phase contactor 102, 142a and 142b is energized and ready to pick up the load. The parallel pole contactor 102 is also coupled to a red indicator light 104 for indicating that the A phase control unit 80 is connected and closed for carrying load. Coupled in circuit with the green light indicators is a three pole (normally closed) relay 110 which opens when contactors 102, 142a and 142b close. Also connected in circuit with transformer 120 are a first relay contact 124 and a second relay contact 126. Connected to the neutral of transformer 120 via a control power ground cable 130 is a control power grounding connector 132. Connected to contactor 110 is the phase C receptacle 134 for connecting the A phase contact control unit 80 to the C phase contact control unit 84. Pendant control cable receptacle 112 is adapted for receiving and coupling to an input control unit 128. Input pendant control unit 128 includes a first pair of normally closed contacts 127 in parallel, and a second pair of normally open contacts 128 in series, where the input voltage control unit is coupled to receptacle 112 by means of a 3 conductor remote control cable 94 and a plug 114. Receptacle 112 is coupled to first and second ICE cube relays 116 and 118 for providing the correct contactor solenoid coil voltage to the A phase control unit 80, to the B phase control unit 82, or to the C phase control unit 84. Manually opening the two normally open contacts 127 applies either a 120 or 277 control voltage to ICE Cube relays 116 and 118, which energizes load carrying contactor solenoid 105 to close load carrying contactors 102, 142a and 142b paralleling fuse links 76a, 76b and 76c. After paralleling the fuse links with the portable load contactors, the fuse links 76a, 76b and 76c can be physically removed. Operation of the pendant push buttons 128 opens the contactors 102, 142a, 142b, interrupting the load on the defective network protector and permitting manual opening of the defective network protector unit. The grounding of control transformer 120 is provided via the control grounding cable 130 to the control power grounding connector 132 for coupling to system neutral. The A phase control unit 80 further includes a phase C control receptacle 34 for coupling to the C phase control unit 84.

The Ice Cube relays 116, 118 function to automatically select the operating control voltage (120/208 or 277/480) to insure the 120 volt operating coils 105a, 146b, and 146c for each distribution load carrying contactor are not over-voltaged. A solenoid 105a, 146b operates contactors 102, 142a and 142b to parallel (transfer) the load from the fuse links 76a, 76b, and 76c. After removing the fuse links, the contractors open the circuit between the network transformer and the aforementioned network protector 66.

Rated load carrying time duration is 30 minutes for 800 amp derated contactors, load carrying jumper cables 78a, 78b and 78c and Leviton connectors 79a, 79b and 79c.

Each single phase contactor 102, 142a and 142b has a 300 volt, rated 800 amp current limiting fuse 105 shown in FIG. 4 with 200,000 volt symmetrical interrupting capacity to provide fault clearing in the case of a ground fault occurring during the network contactor clearing function.

A visible indication of an energized connection is provided by green pilot light 106 as each phase contactor is energized when the hand installed Leviton cam-type female connectors 79a, 79b and 79c are attached to modified male cam-type studs 184 installed in orifices 178 adjacent to fuse links 170 on the 120/208 or 277/480 network protector energized bus as shown in FIG. 6.

A visible indication is provided by red pilot light 104 when the electrical load is paralleled (transferred) to the portable contactor 102 as pendant buttons 127 and 128 are operated to parallel all 3 portable contactors 102, 142a and 142b with fuse links 76a, 76b and 76c.

Control power for contactors 102, 142a and 142b, control relay coils 105 and indicating lights 104 and 148 are provided to each phase control unit, or contactor enclosure, with control cables attached between the A phase control unit 80, and to each of the B and C phase control units 82 and 84. Phase contactor 102 receives control power from the network secondary protector bus via load cables 78a. The B phase control unit 82 receives control power from the A phase contactor 102, and the C phase control unit 84 also receives its power from the A phase contactor.

A 15 amp circuit breaker 103 provides control voltage overload protection and also backup emergency trip for load carrying contactors 102 and 142a, and is located in the A phase control unit 80.

An external ground green #12 flexible copper conductor 130 with a 75 amp 3½ inch alligator clip connector 132 is provided for attachment of the front relay contact 124 to multi-ground neutral winding 35 shown in FIG. 2 for establishing control power.

A 3 pole, 120 volt normally closed control relay 122 energizes green indicator light 106 in each of the three phase control units 80, 82 and 84 when the single phase contactors are energized in parallel across fuse links 76a, 76b and 76c. The green light 106 extinguishes while the red pilot light 104 glows when the load carrying contactor solenoids 105 and 146 are energized.

The 120 volt and 277 volt control ICE Cube relays 116 and 118 energize red indicator lights on each contactor 102, 142a and 142b when the contactor is closed and load current is transferred to the contactor from the fuse links 103a, 103b and 103c.

The control voltage 120 volt ICE Cube relay 116 isolates 277 volt solenoid 118 for 120/208 volt application and the 277 volt ICE Cube relay 118 isolates the 120 volt solenoid 116 for 277-120 volt transformer operation of 120 volt control relay 105.

The remote control 3 phase network protector bypass contactor switches are portable with 4 nonmetallic cases. One case provides portability for 3 sets of load carrying cables 18 and two cases each contain a single phase contactor with control cables 86 and 88 for B and C phase control units 82 and 84. The A phase control unit 80 provides control power for all the phases. The A single phase contactor 102 and control are contained in a separate portable case.

Referring to FIGS. 4 and 5, each set of 3 phase distribution load carrying contactor poles 102, 142a and 142b are in parallel via a 4"×¼" aluminum bus 142 with a current capacity 980 amp rating.

Twenty (20) amp rated plug 114 and socket 112 combinations and industrial grade locking devices provide pendant control circuit 90 with attachment to the A phase controller 80 via a 20 FT, 3/0 pendant control cable 94.

With reference to FIG. 4, control transformer 120 with 277-115 volt taps provides 120 volts for operation of 120 volt contactor coils 102, 142a and 142b in each of phase control units 80, 82 and 84 when 277 volts is the available phase to ground at 277/480 voltage network center vaults.

Referring to FIG. 5, there is shown in combined block and schematic diagram form the B or C phase control units 82 and 84. Each of the B and C phase control units 82 and 84 includes connector 160 for receiving a 120 or 277 volt input via respective first and second pairs of jumper cables 78a and 78b from the fuse link compartment 74 as shown in FIG. 3. The input voltage is provided to a contactor 142 as well as to a fuse 144. Ice Cube relay 116 or Ice Cube relay 118 actuates a red indicator light 148 in parallel with contactor coil 146 to indicate that current is flowing in the B phase control unit 82 or in the C phase control unit 84. Illumination of the green indicator light 150 indicates that the contactor 142 is energized and is connected to the load side of current limiting fuse for the voltage source. A ground bar 154 is coupled to contactor coil 146 in providing a neutral bus. Plugs 140a and 140b each include a locking capability such as of the Leviton type when the plug receptacles are inserted together, so that these two components cannot be accidently disconnected. The green indicator light 150 illuminates to indicate that to the operator that the system is alive and ready for closing. Fuse 144 limits current to protect an operator if a fault occurs. Fuse 144 also clears a fault in less than ¼ cycle to prevent excess energy from damaging or destroying contactor 142. The contactor 142 has load interrupting capacity, but no fault current interrupting capacity. The green indicator light 150 goes out when contactor 142 closes and the red indicator light 148 then illuminates to indicate that load current has been transferred to the contactor. Referring also to FIG. 3, the B phase control units 82 further includes a plug 160 and a receptacle 162 for selecting the first conductor pair 86 connecting the A phase control unit 80 to the B phase control unit or the second conductor pair 88 coupling the A phase control unit to the C phase control unit 84. Contactor 142 is further coupled to the plug 160 and receptacle 162 via a closed and trip cable 158, while fuse 144 is further coupled to the plug and receptacle via a contactor energized cable 164 which provides an indication that the contactor is energized. A 3 conductor cable 156 couples the plug 160 to the receptacle 162.

In summary, the inventive bypass portable network protector connects via a cable to only the front side of the energized network bus. This temporary cable connection also provides safe working conditions for linemen to isolate a defective network protector by removing bypassed fuse links on the bus bar connection to the network vault secondary bus.

The energized 480 volt bus connected to the defective network protector is only accessible from the front when making the fuse bypass connection. Prior procedure used tapered copper probes attached to cables and inserted into ½" diameter holes provided adjacent to fuse links.

An inventive copper bus attachment provides front access for the bus and accommodates a modified Leviton snap lock brass connection to the network cables. This aspect of the present invention involves the safe connection and disconnection of the network protector isolator to and from the line network bus using an inventive connection arrangement described in the following paragraphs.

Referring to FIG. 6, there is shown an exploded lateral sectional view of an arrangement for coupling the network protector isolator of the present invention to the network protector's bus bar. The network protector's bus bar is shown in FIG. 6 as having an upper network protector bus bar 180a and a lower network protector bus bar 180b. The upper and lower network protector bus bars 180a, 180b are electrically connected to one another by means of a fuse link 170. Fuse link 170 shown in FIG. 6 corresponds to the fuse links 70a, 70b and 70c shown in FIG. 2 as positioned within the secondary network protector 66 on the load side of the network transformer 44. The secondary network protector 66 can be isolated from the network transformer secondary by removing the bolted fuse links 70a, 70b and 70 which are also connected to (3) cables in the secondary, or load side, of the network. A pair of these cables are illustrated as elements 182a and 182b which are respectfully coupled to the network protector bus bar 180a and the lower network protector bus bar 180b as described below.

The fuse link 170 is coupled to the upper network protector bus bar 180a by means of a first nut and bolt combination 172a, and is connected to the lower network protector bus bar 180b by means of a second nut and bolt combination 172b. The upper network protector bus bar 180a includes a first aperture, or slot 178a, while the lower network protector bus bar 180b includes a second aperture 178b extending there through. The upper network protector bus bar's first aperture 178a is adapted to receive a first bus bar connector 174 in accordance with the present invention, while the lower network protector bus bar's second aperture 178b is adapted to receive the second bus bar connector 176 also in accordance with the present invention. For simplicity, only the first bus bar connector 174 is described in detail in the following paragraphs, it being understood that the second bus bar connector 176 is identical to the first bus bar connector in configuration and in the functions that it carries out.

Copper insert 184 includes a first elongated hollow end 184a, and inner nut portion 84b and a second threaded end 84c. The first elongated hollow end 84a includes an inner portion which is tapered in preceding from the end of the copper insert to its inner nut portion 84b. The hollowed out, tapered portion of the copper insert's first elongated hollow end 84a is adapted to receive a hollow, cylindrically shaped wedge member 86 preferably comprised of brass. The hollowed out inner portion of the brass wedge member 186 is provided with a female thread arrangement. Wedge member 186 is adapted for insertion in the hollowed out inner portion of the copper insert's first elongated hollow end 184a. The copper insert's first elongated hollow end 184 is adapted for insertion in the upper network protector bus bar's first aperture 178a and is disposed along the length of the aperture.

Bus bar connector 174 further includes a hex volt 188 adapted for insertion into the hollowed out inner portion of the copper insert 184. The outer threaded portion of the hex bolt 88 is adapted for insertion into and engagement with the threaded inner portion of the brass wedge member 186. Tightening of the hex bolt 188 within the brass wedge member 186 draws the brass wedge member leftward as viewed in FIG. 6 into and along the length of the tape copper inserts first elongated hollow end 184a. This causes an outward urging of the first elongated hollow end of the copper insert 184 into engagement with the inner surface defining the first aperture 178a in the upper network protector bus bar 180a. Increasing the extent of contact and the engaging force between the outer surface of the copper inserts first elongated hollow end 184a and the inner cylindrical surface defining the upper network protector bus bar's first aperture 78a increases the electrical contact between the copper insert 184 and the upper network protector bus bar 180a. Hex bolt 188 is adapted for secure engagement with the inner threads of the brass wedge member 186. Rotational displacement of the hex bolt 188 draws the brass wedge member 186 rightward as viewed in FIG. 6 within the copper inserts first elongated hollow end 184a so as to displace the first elongated hollow end outwardly toward and into secure engagement with the cylindrical surface defining the upper network protector bus bar's first aperture 178a. Increasing the extent of contact and the engaging force between the copper insert 184 and the upper network protector bus bar 180a increases the electrical contact between these elements.

Bus bar connector 174 further includes a brass male cam lock receptacle 190 having a hollowed out first end portion provided with a female threaded portion. The open threaded end portion of the brass male cam lock receptacle 190 is adapted for positioning over and engagement with the male second threaded end 184c of the copper insert 184. The opposing end of the brass male cam lock receptacle 190 is provided with a first cam lock portion 190b.

The first bus bar connector 174 further includes a female brass cam lock connector 192 adapted for engagement with and coupling to the first cam lock member disposed on the end of the brass male cam lock receptacle 190. The other end of the female brass cam lock connector 192 is securely connected to a second electric power cable 182a in a conventional manner. Disposed about and in tight fitting engagement with a portion of the female brass cam lock connector 192 and its electrical connection with the second cable 182a is a plastic insulating cover 194.

While particular embodiments of the present invention have been described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The invention claimed is:

1. For use in a high voltage, multi-cable electric power distribution network including a network bus and having a power transformer and a network protector coupled to said network via a fuse link, wherein the network protector is subject to malfunctioning allowing a load power current to flow through the power transformer in a direction opposite to the direction of current flow during normal operation resulting in a highly dangerous situation, apparatus for isolating a malfunctioning network protector from said power distribution network and for allowing said network protector to be safely reset, said apparatus comprising:
  a 3 phase controller coupled by parallel single phase poles in plural contactors to said fuse link and adapted to receive an electric load current flowing in reverse through said network power transformer;
  a remote controlled switch coupled to said 3 phase controller for switching the electric load current from said network protector via said controller to the network bus, with said controller then carrying the electric load current in parallel with said network protector fuse link; and
  visual indicators coupled to said controller for providing visual indications of when said remote controlled switch has been activated to transfer the load current from said fuse links to said controller and when the electric load current has been transferred from said controller to the network bus.

2. The apparatus of claim 1, wherein said remote switch is manually operated and wherein the electric power distribution network includes three sets of current-carrying load network cables with each current having a respective phase, and wherein said controller includes three phase-responsive control units each coupled to a respective pair of said cables for comparing the phase of the current in each of the three cables and providing an indication of when a difference in phase relationship among the three currents is at a minimum value for indicating to an operator to activate said manual switch for transferring the currents by said controller to the network bus.

3. The apparatus of claim 2, wherein said controller includes coupled A phase, B phase and C phase control units each coupled to a respective one of said network cables for transferring the load in each of the three network cables and for switching the network currents to said network bus in response to operator inputs to said manual switch.

4. The apparatus of claim 3, wherein each control unit includes a respective single phase contactor having 3 paralleled poles and a 300 volt, 800 amp rated current limiting fuse with a 200,000 symmetrical interrupting capacity to provide fault clearing in the event of a ground fault during transfer of the electric load current from a malfunctioning network protector to the network bus.

5. The apparatus of claim 4, further comprising plural insulated male and female tapered cam-lock bushing connectors each coupling a cable to a respective one of said contactors in said control unit, wherein said contactor poles are arranged in parallel across a network protector bus fuse link.

6. The apparatus of claim 5, wherein said manual switch includes first and second recessed spring loaded buttons paralleled for either simultaneous closing or tripping of said parallel load break contactors in each control unit.

7. The apparatus of claim 6, wherein one of said control units is a primary control unit having each control unit further first and second relays coupled to said first and second buttons in said manual switch and responsive to operator energizing for automatically switching the power distribution network operating voltage to 120 volts or to 277 volts to ground.

8. The apparatus of claim 5, further comprising a circuit breaker disposed in each of said controllers for providing control overload protection and back-up emergency trip load for said network cables.

9. The apparatus of claim 3, wherein each of said A phase, B phase and C phase control units is coupled to a network protector secondary bus connected to said network cables.

10. The apparatus of claim 9, wherein said A phase control unit provides control power to said B and C phase control units.

11. The apparatus of claim 3, wherein each of said A phase, B phase and C phase control units includes a respective pair of visual status indicators for indicating when said contactor has been energized to transfer load current from said network protector to said phase control units and when the electric load current is transferred to said controller to confirm the network protector can be safely removed from the power distribution network by removal of the fuse links.

12. The apparatus of claim 11, wherein said control units further includes first and second relays coupled to said manual switch and to said pair of visual indicators for energizing a first visual indicator when said control circuit is energized and an energizing second visual indicator when contractor is closed and said load current is transferred to the contactors in said control units.

13. The apparatus of claim 3, further comprising a transformer coupled to each of plural contactor solenoids in each of said A phase, B phase and C phase control units.

14. The apparatus of claim 1, wherein said controller is coupled to said fuse link by means of quick connect and disconnect cam lock studs and connectors to expedite isolation of the network protector and to provide the apparatus for isolating a network protector with portability.

15. The apparatus of claim 1, further comprising an extended pendant control cable connecting said manual switch to said controller for remotely controlling the apparatus for isolating a network protector.

* * * * *